(12) United States Patent
Wu et al.

(10) Patent No.: US 10,223,981 B2
(45) Date of Patent: Mar. 5, 2019

(54) DISPLAY SYSTEM WITH AUTOMATIC BRIGHTNESS ADJUSTMENT (71) Applicant: BENQ CORPORATION, Taipei (TW)

(72) Inventors: Ho-Shih Wu, Taipei (TW); Hsin-Nan Lin, Taipei (TW)

(73) Assignee: BenQ Corporation, Taipei (TW)

( * ) Notice: Subject to any disclaimer, the term of this patent is extended or adjusted under 35 U.S.C. 154(b) by 0 days.

(21) Appl. No.: 15/861,619

(22) Filed: Jan. 3, 2018

(65) Prior Publication Data
US 2018/0204527 A1 Jul. 19, 2018

(30) Foreign Application Priority Data
Jan. 19, 2017 (CN) .......................... 2017 1 0043194

(51) Int. Cl.
G09G 3/34 (2006.01)
G09G 3/36 (2006.01)
H05B 33/08 (2006.01)

(52) U.S. Cl.
CPC ....... G09G 3/3406 (2013.01); H05B 33/0872 (2013.01); G09G 3/36 (2013.01);
(Continued)

(58) Field of Classification Search
CPC ..... G01S 19/14; G02B 6/0068; G02F 1/1336; G02F 1/167; G02F 2001/133616; G02F 2201/58; G09G 2310/08; G09G 2320/0238; G09G 2320/0271; G09G 2320/041; G09G 2320/08; G09G 2330/021; G09G 2360/144; G09G 2360/16; G09G 2380/14; G09G 3/2096; G09G 3/3406; G09G 3/344; G09G 3/36; G09G 5/02; G09G 5/10; G09G 5/30; G09G 2320/0626; G09G 2320/0666; G09G 2300/0456; G09G 2320/064; G09G 2320/0646; G09G 2320/066; G09G 2320/0673; G09G 3/2003; H04N 21/42202; H04N 21/4318; H04N 5/58; H04N 9/73;
(Continued)

(56) References Cited

U.S. PATENT DOCUMENTS 9,495,915 B1 * 11/2016 Manyam ................ G09G 3/344
2005/0151716 A1 * 7/2005 Lin .......................... G09G 3/20
345/102
(Continued)

FOREIGN PATENT DOCUMENTS

CN 104517585 A 4/2015
CN 104700816 A 6/2015
(Continued)

OTHER PUBLICATIONS

"Brightness" and "Contrast" controls, Charles Poynton; http://poynton.ca/notes/brightness_and_contrast/, 2002.*

Primary Examiner — Alexander H Taningco
Assistant Examiner — Renan Luque (57) ABSTRACT A display system includes a display device having a screen, a lamp, a first optical sensor, a second optical sensor, and a controller. The controller is configured to adjust the luminance parameter of the lamp according to the environmental light parameter detected by the first optical sensor and then adjust the display parameter of the screen according to the overall brightness of the display device detected by the second optical sensor.

7 Claims, 6 Drawing Sheets (52) U.S. Cl.
CPC ........... *G09G 2320/0626* (2013.01); *G09G 2320/0646* (2013.01); *G09G 2320/0666* (2013.01); *G09G 2360/144* (2013.01); *G09G 2360/145* (2013.01)

(58) Field of Classification Search
CPC .......... H04N 21/41407; H05B 37/0281; H05B 33/0872; H05B 33/0848; H05B 33/0851; H05B 33/0854; H05B 37/02; H05B 37/0218; H05B 37/0227; Y02B 20/42; Y02B 20/46

See application file for complete search history.

(56) References Cited

U.S. PATENT DOCUMENTS

| | | | | |
|---|---|---|---|---|
| 2009/0161030 | A1* | 6/2009 | Wang | H04N 9/73 348/801 |
| 2009/0167789 | A1 | 7/2009 | Kerofsky | |
| 2009/0237423 | A1 | 9/2009 | Shih | |
| 2009/0240311 | A1* | 9/2009 | Andersen | A61M 21/00 607/90 |
| 2009/0289580 | A1* | 11/2009 | Dunn | H05B 33/0872 315/307 |
| 2010/0061080 | A1* | 3/2010 | Salters | G02B 6/0068 362/97.1 |
| 2010/0097408 | A1* | 4/2010 | Michael Marcellinus | G02B 6/001 345/690 |
| 2010/0188418 | A1* | 7/2010 | Sakai | G01J 1/4204 345/594 |
| 2011/0037576 | A1* | 2/2011 | Jeon | G06F 1/1626 340/407.2 |
| 2011/0074803 | A1 | 3/2011 | Kerofsky | |
| 2014/0002428 | A1* | 1/2014 | Letourneur | G09G 3/34 345/207 |
| 2014/0049527 | A1 | 2/2014 | Lanzoni | |
| 2014/0232709 | A1* | 8/2014 | Dunn | G09G 5/02 345/207 |
| 2014/0362065 | A1* | 12/2014 | Fujio | G09G 5/02 345/207 |
| 2017/0229059 | A1* | 8/2017 | Bonnier | G06F 3/044 |
| 2017/0303365 | A1* | 10/2017 | Chen | H05B 33/0872 |
| 2017/0372665 | A1* | 12/2017 | Han | G09G 3/2092 |

FOREIGN PATENT DOCUMENTS

| | | |
|---|---|---|
| CN | 204388000 U | 6/2015 |
| CN | 105674155 A | 6/2016 |
| EP | 1 251 482 A2 | 10/2002 |
| TW | 200939201 | 9/2009 |
| TW | 201334624 A1 | 8/2013 |

* cited by examiner

DISPLAY SYSTEM WITH AUTOMATIC BRIGHTNESS ADJUSTMENT

CROSS REFERENCE TO RELATED APPLICATION

This application claims the benefit of China Patent application No. 201710043194.7 filed on Jan. 19, 2017.

BACKGROUND OF THE INVENTION

1. Field of the Invention

The present invention is related to a display system with automatic brightness adjustment, and more particularly, to a display system with automatic brightness adjustment based on ambient light parameter and overall brightness.

2. Description of the Prior Art

Computer vision syndrome (CVS) is a condition resulting from focusing the eyes on a computer or other display devices for protracted, uninterrupted periods of time. Some symptoms of CVS include headaches, blurred vision, neck pain, fatigue, eye strain, dry eyes, irritated eyes, double vision, and vertigo/dizziness.

When using a display device in indoor or other poor-lit environment, a lamp may typically be used as an extra light source in a prior display system. When the lamp is too bright, the screen of the display device may result in glare which further aggravates CVS symptoms. The luminance of the lamp may also change the color of display images which lowers the display quality. In the prior display system, the user needs to repeatedly adjust the brightness and color of the lamp and the screen for a given application, and a luminometer and a colorimeter are required in order to monitor the result of each adjustment, thus causing inconvenient user experiences.

SUMMARY OF THE INVENTION

The present invention provides a display system with automatic brightness adjustment. The display system includes a display device having a screen, a lamp configured to provide a light source, an optical sensor configured to detect an ambient light parameter, and a controller configured to adjust a display parameter of the screen and a luminance parameter of the light source according to the ambient light parameter.

The present invention also provides a display system with automatic brightness adjustment. The display system includes a display device having a screen, a lamp configured to provide a light source, an optical sensor configured to detect an ambient light luminance when the lamp is turned on, and a controller configured to adjust a brightness of the screen according to the ambient light luminance, and then adjust an intensity of the light source according to an overall brightness of the display device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
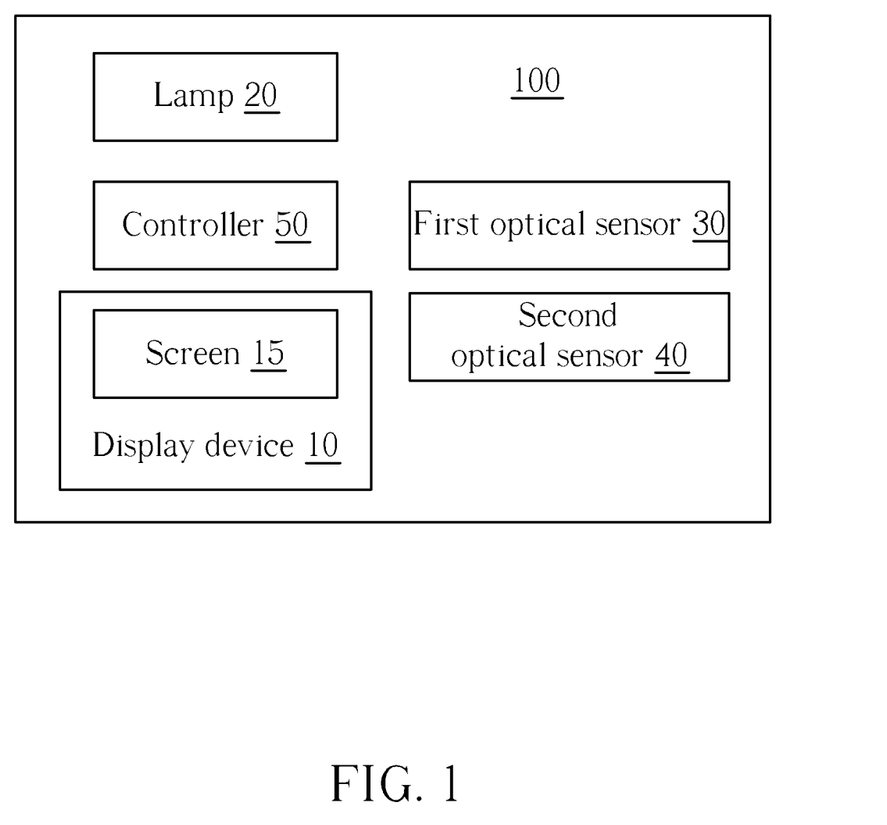
FIG. 1 is a functional diagram illustrating a display system with automatic brightness adjustment according to an embodiment of the present invention.

FIG. 1 is a functional diagram illustrating a display system 100 with automatic brightness adjustment according to an embodiment of the present invention. The display system 100 includes a display device 10, a lamp 20, a first optical sensor 30, a second optical sensor 40, and a controller 50.

The display device 10 includes a screen 15. The controller 50 is configured to adjust display parameters (such as the brightness/color temperature) of the screen 15 and luminance parameters (such as the brightness/color temperature) of the lamp 20. The operation of the controller will be described in more details in subsequent paragraphs.

In the present invention, the display device 10 may be a liquid crystal display (LCD), a plasma display panel (PDP), a light emitting diode (LED), an organic light emitting diode (OLED), a field emission display, or another type of display devices. However, the type of the display device 10 does not limit the scope of the present invention.

In the present invention, the operations of the screen 15 and the lamp 20 are controlled by the controller 50 and supplied by the same power source (not depicted). In indoor or poor-lit environments, the lamp 20 may provide extra luminance and its luminance parameters may be adjusted using the controller 50. Related methods will be described in more details in subsequent paragraphs.

Figure 2:
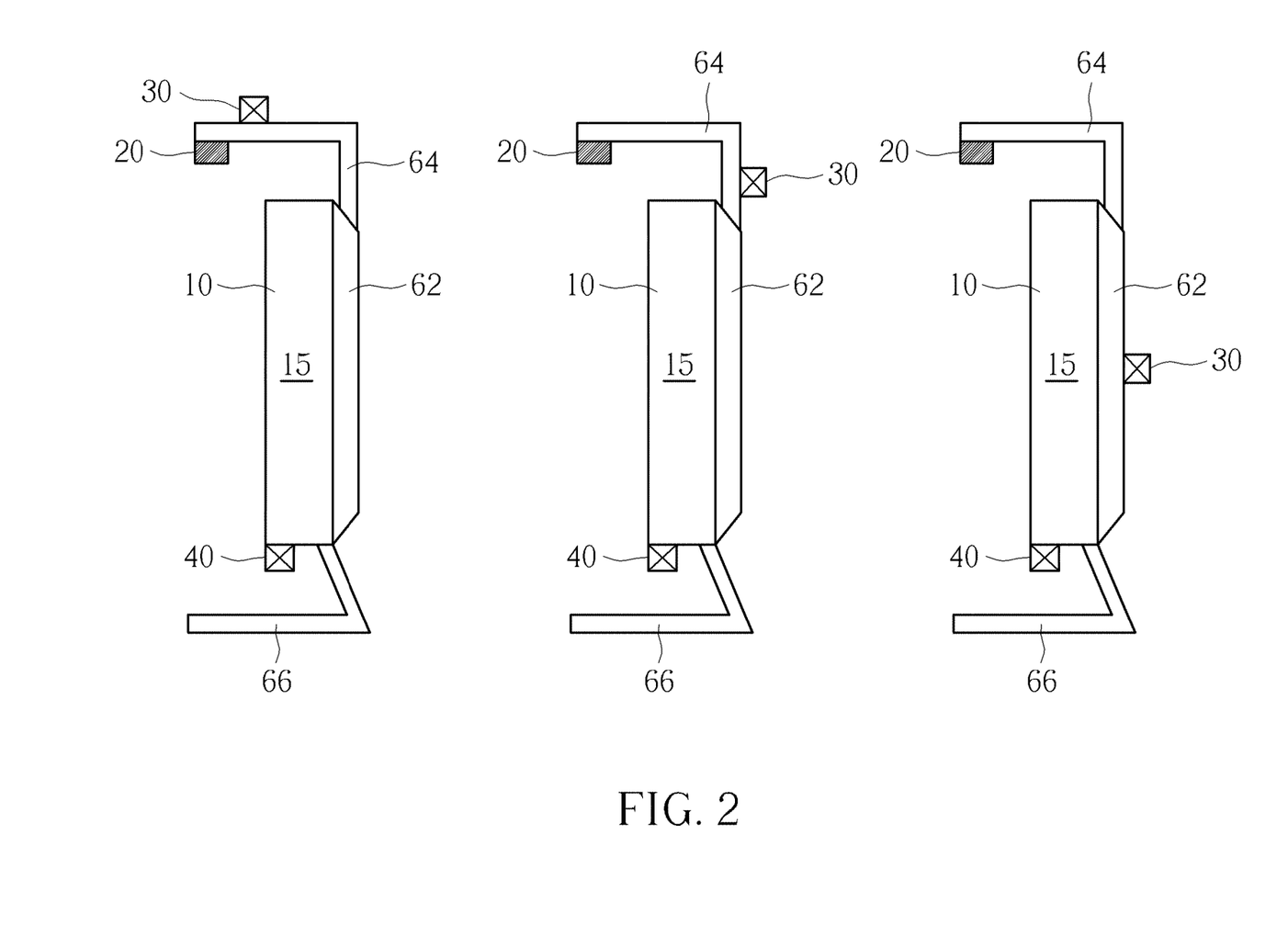
FIG. 2 is a diagram illustrating the arrangement of the lamp and the optical sensors in a display system according to an embodiment of the present invention.

FIG. 2 is a diagram illustrating the arrangement of the lamp and the optical sensors in the display system 100 according to an embodiment of the present invention. The display system 100 further includes a housing 62, a detachable holder 64, and a base 66. The housing 62 is used to contain the screen 15 and the controller 50 (not shown in FIG. 2). The detachable holder 64 is disposed on a specific location of the display device 10 for containing the lamp 50. In the embodiment illustrated in FIG. 2, the detachable holder 64 is disposed directly above the display device 10 so that the lamp 50 may provide light from the top of the screen 15. In another embodiment, the detachable holder 64 is disposed on the lateral of the display device 10 so that the lamp 50 may provide light from the lateral of the screen 15. However, the location of the lamp 20 in the display system 100 does not limit the scope of the present invention.

In the present invention, the detachable holder 64 may also be used to contain the first optical sensor 30, or the first optical sensor 30 may be disposed at a specific location on the housing 62 of the display device 10, wherein the location of the first optical sensor 30 is unaffected by luminance of the lamp 20. In the embodiment illustrated on the left side of FIG. 2, the first optical sensor 30 is disposed on the detachable holder 64 and located above the lamp 20. In the embodiment illustrated in the middle of FIG. 2, the first optical sensor 30 is disposed on the detachable holder 64 and located behind the lamp 20. In the embodiment illustrated on the right side of FIG. 2, the first optical sensor 30 is disposed on the housing 62 of the display device 10 and located at the rear of the screen 15.

In the present invention, the second optical sensor 40 is disposed on the display device 10. In the embodiment illustrated in FIG. 2, the second optical sensor 40 is disposed under the screen 15. In other embodiments, the second optical sensor 40 maybe disposed on any location at which the second optical sensor 40 is able to detect the overall brightness of the display device 10.

Figure 3:
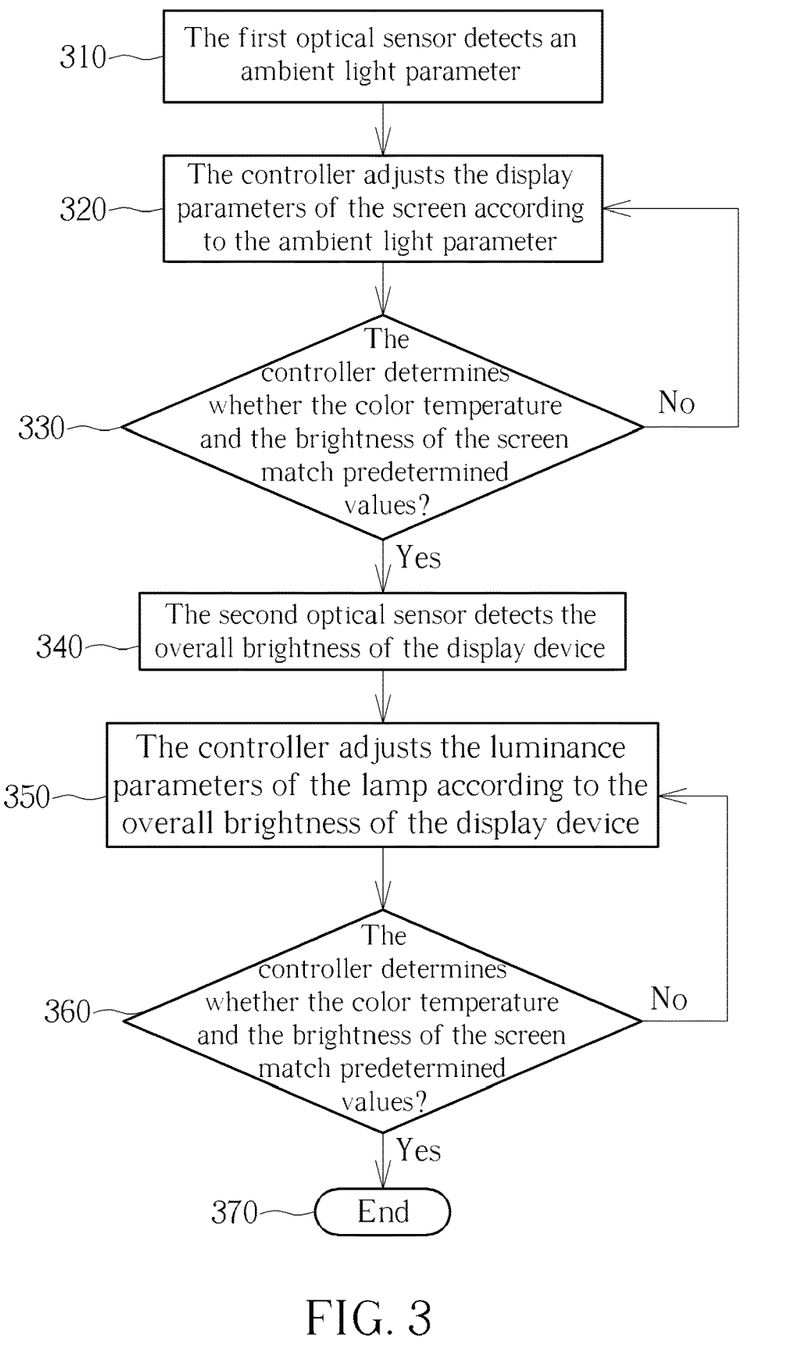
FIG. 3 is a flowchart illustrating the operation of a display system according to an embodiment of the present invention.

FIG. 3 is a flowchart illustrating the operation of the display system 100 according to an embodiment of the present invention. The flowchart in FIG. 3 includes the following steps:

Step 310: the first optical sensor 30 detects an ambient light parameter; execute 320.

Step 320: the controller 50 adjusts the display parameters of the screen 15 according to the ambient light parameter; execute 330.

Step 330: the controller 50 determines whether the color temperature and the brightness of the screen 15 match predetermined values; if yes, execute 340; if no, execute 320.

Step 340: the second optical sensor 40 detects the overall brightness of the display device 10; execute 350.

Step 350: the controller 50 adjusts the luminance parameters of the lamp 20 according to the overall brightness of the display device 10; execute 360.

Step 360: the controller 50 determines whether the color temperature and the brightness of the screen 15 match predetermined values; if yes, execute 370; if no, execute 350.

Step 370: end.

In the present invention, the first optical sensor 30 is an ambient light sensor capable of detecting an ambient light parameter in step 310, such as detecting an ambient light luminance when the lamp 20 is turned on.

In step 320, the controller 50 is configured to adjust the display parameters of the screen 15 according to the ambient light parameter, such as adjusting the brightness and color temperature of the screen 15 according to the ambient light luminance. Then in step 330, the controller 50 is configured to determine whether the color temperature and the brightness of the screen 15 match predetermined values. More specifically, the controller 50 is configured to acquire an ambient light color temperature according to the ambient light luminance, adjust the brightness of the screen 15 according to the ambient light luminance, and adjust the color temperature of the screen 15 according to the ambient light color temperature. As previously stated, when the lamp 20 is too bright, the screen 15 may result in glare which further aggravates CVS symptoms. The luminance of the lamp 15 may also change the color of display images which lowers the display quality, the screen 15 may cause glare or change the color of images, thus lowering the display quality. In steps 310-330, the present invention can guarantee that the color temperature and the brightness of the screen 15 match predetermined values when the lamp 20 provides specific brightness and color temperature.

In step 350, the controller 50 is configured to adjust the luminance parameter of the lamp 20 according to the overall brightness of the display device 10, such as adjusting the brightness and/or color temperature of the lamp 20. Then in step 360, the controller 50 is configured to determine whether the color temperature and the brightness of the screen 15 match predetermined values. More specifically, the controller 50 is configured to acquire an ambient light color temperature according to the ambient light luminance, adjust the brightness of the lamp 20 according to the overall brightness, and adjust the color temperature of the lamp 20 according to the ambient light color temperature.

Figure 4:
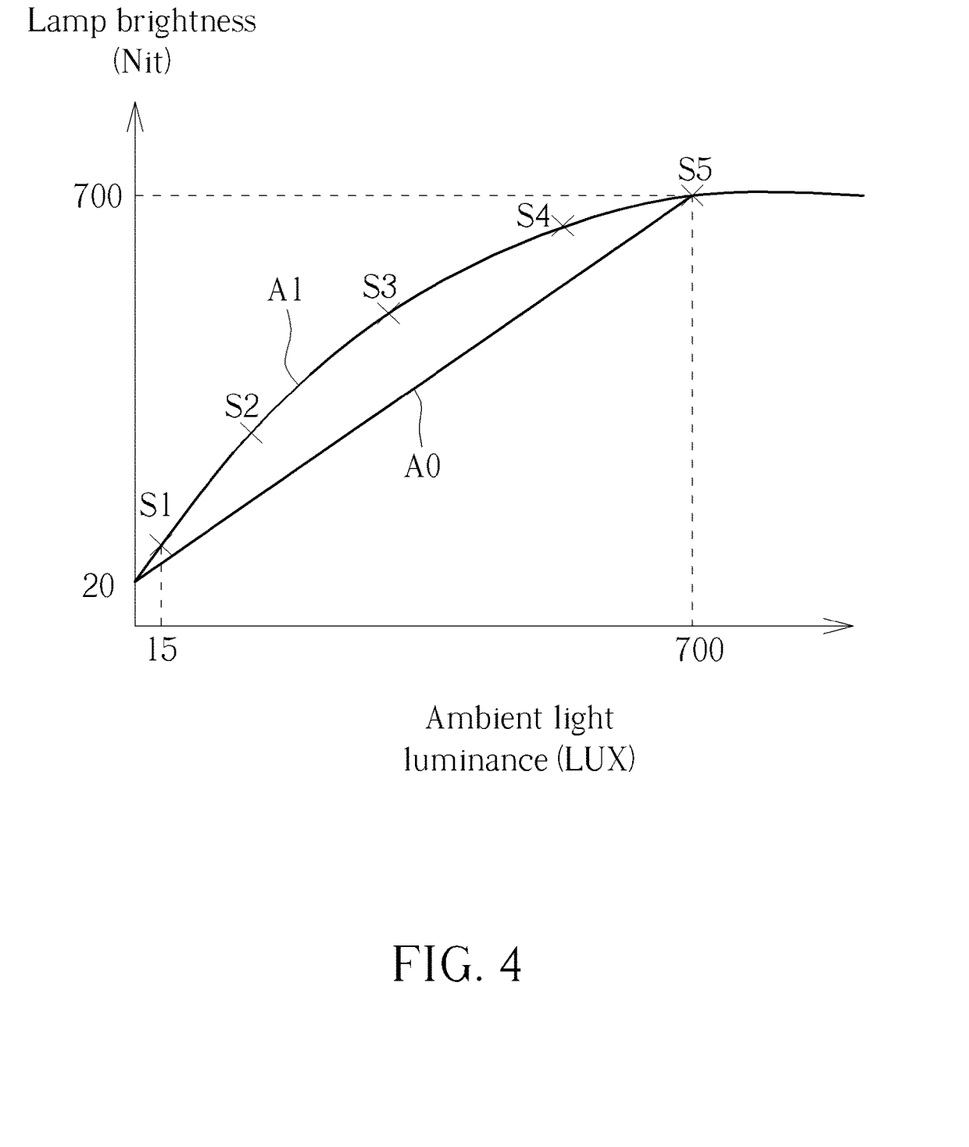
FIG. 4 is a diagram illustrating the operation of adjusting the display parameter of the screen according to the ambient parameter according to an embodiment of the present invention.
Figure 5:
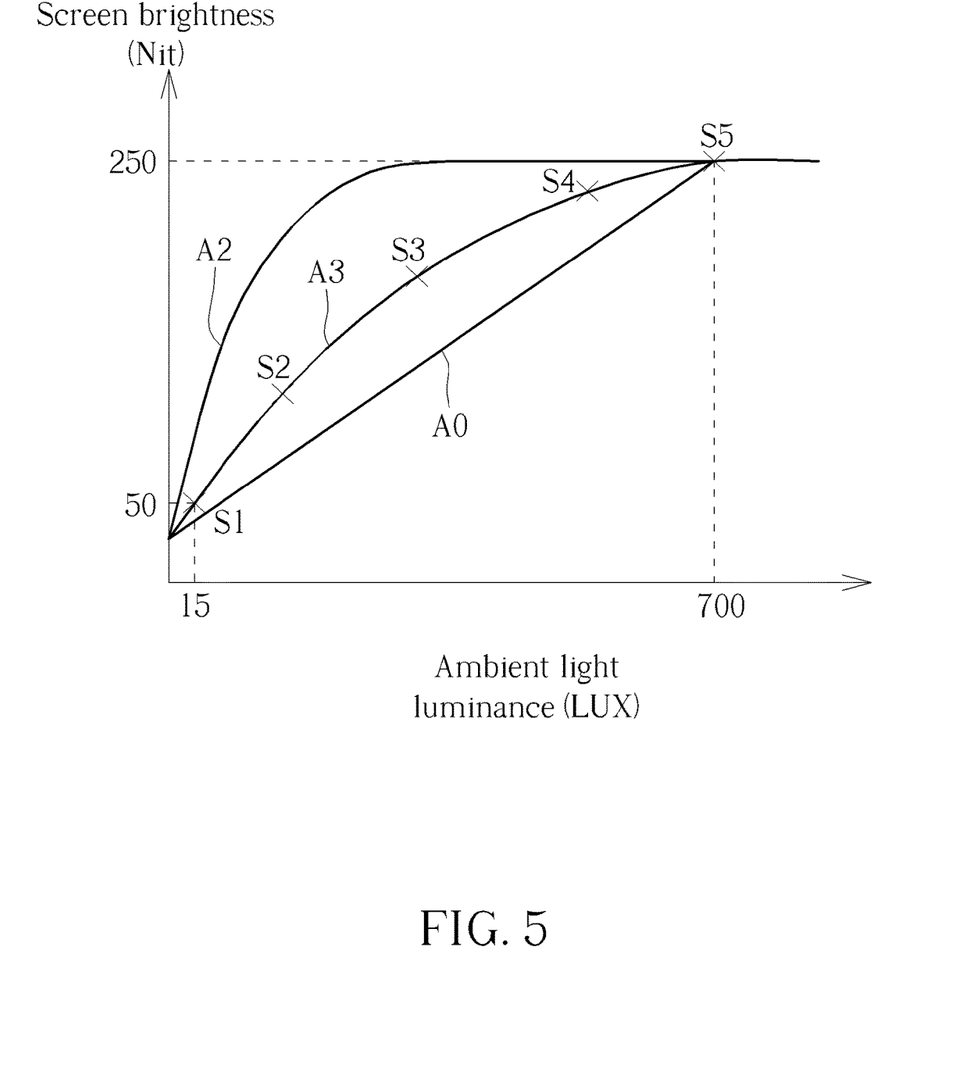
FIG. 5 is a diagram illustrating the operation of adjusting the luminance parameter of the lamp according to the overall brightness according to an embodiment of the present invention.
Figure 6:
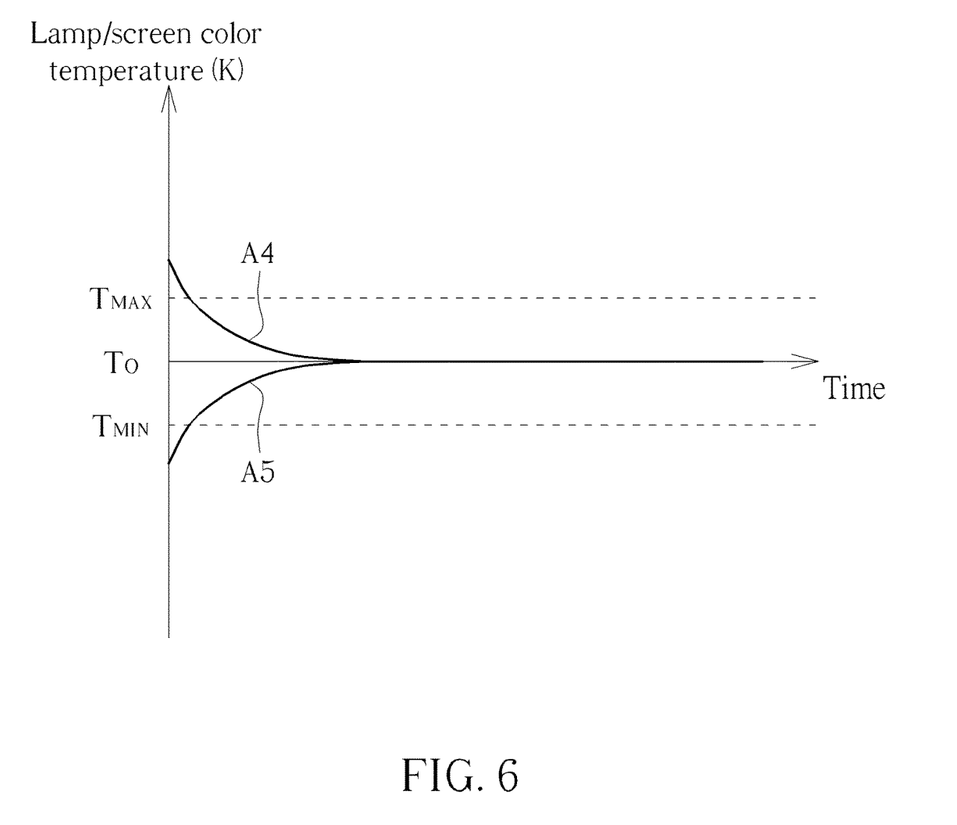
FIG. 6 is a diagram illustrating the operation of adjusting the display parameter of the screen and the luminance parameter of the lamp according to the ambient parameter and the overall brightness according to an embodiment of the present invention.

FIGS. 4-6 are diagrams illustrating the operation of adjusting the display parameter of the screen 15 according to the overall brightness. In FIG. 4, the vertical axis represents the brightness of the lamp 20 in Nit, and the horizontal axis represents the ambient light luminance in LUX. Curve A0 is a linear curve representing a default level of ambient light luminance corresponding to each dimming location. For illustrative purpose, it is assumed that the display system 100 adopts a 5-location dimming represented by S1~S5. As depicted in FIG. 4, curve A1 represents the operation of the controller 50 when adjusting the brightness of the lamp 20 according to the ambient light luminance.

In FIG. 5, the vertical axis represents the brightness of the screen 15 in Nit, and the horizontal axis represents the ambient light luminance in LUX. Curve A0 is a linear curve representing a default level of ambient light luminance corresponding to each dimming location. Curve A2 is an exponential curve representing a default level of screen brightness corresponding to each dimming location for a given application. For illustrative purpose, it is assumed that the present display system 100 adopts a 5-location dimming represented by S1~S5. As depicted in FIG. 5, curve A3, whose value is between the exponential curve A2 and the linear curve A0, represents the operation of the controller 50 when adjusting the brightness of the screen 15 according to the overall brightness.

In FIG. 6, the vertical axis represents the color temperature of the lamp 20/screen 15 in K, the horizontal axis represents time, $T_O$ represents the target color temperature, $T_{MAX}$ represents the maximum value within the ideal color temperature range, and $T_{MIN}$ represents the minimum value within the ideal color temperature range. Curve A4 and curve A5 represent the operation of the controller 50 when adjusting the color temperature of the lamp 20 and the screen 15 according to the ambient light luminance and the overall brightness. As depicted by curve A4, when the initial color temperature of the lamp 20/screen 15 exceeds the maximum value $T_{MAX}$ within the ideal color temperature range, the controller 50 is configured to gradually lower the color temperature of the lamp 20/screen 15 for reaching the target color temperature $T_O$. As depicted by curve A5, when the initial color temperature of the lamp 20/screen 15 does not exceed the minimum value $T_{MIN}$ within the ideal color temperature range, the controller 50 is configured to gradually raise the color temperature of the lamp 20/screen 15 for reaching the target color temperature $T_O$.

In an embodiment of the present invention, the controller 50 is configured to adjust the display parameter of the screen 15 according to the ambient light parameter, then adjust the luminance parameter of the lamp 20 according to the ambient light parameter, and then adjust the display parameter of the screen 15 according to the overall brightness. In another embodiment of the present invention, the controller 50 is configured to adjust the luminance parameter of the lamp 20 according to the ambient light parameter, then adjust the display parameter of the screen 15 according to the ambient light parameter, and then adjust the display parameter of the screen 15 according to the overall brightness. However, the sequence of adjusting the display parameter of the screen 15 and adjusting the luminance parameter of the lamp 20 does not limit the scope of the present invention.

In the display system according to the present invention, the controller is configured to adjust the luminance parameter of the lamp according to the ambient light parameter detected by the first optical sensor, and then adjust the display parameter of the screen according to the overall brightness detected by the second optical sensor. Therefore, the present invention can guarantee that the color temperature and the brightness of the screen and the overall brightness of the display system match predetermined values when the lamp provides specific brightness and color temperature, thereby providing high display quality and comfortable viewing experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display system with automatic brightness adjustment, comprising:
    a display device having a screen;
    a lamp configured to provide a light source;
    a first optical sensor configured to detect an ambient light luminance when the lamp is turned on;
    a second optical sensor configured to detect an overall brightness of the display device, wherein the lamp is disposed above the screen and the second optical sensor is disposed on the display device; and
    a controller configured to:
        acquire an ambient color temperature based on the ambient light luminance;
        acquire an overall color temperature based on the overall brightness;
        adjust a color temperature of the screen based on the ambient color temperature and adjust a color temperature of the lamp based on the overall color temperature; and
        adjust a brightness of the screen according to the ambient light luminance, and then adjust an intensity of the light source according to the overall brightness of the display device.

2. The display system of claim 1, wherein the first optical sensor is disposed at a location which is unaffected by luminance of the lamp.

3. The display system of claim 1, further comprising:
    a detachable holder disposed at a location on the display device for containing the lamp and the first optical sensor, wherein the location of the detachable holder is unaffected by luminance of the lamp.

4. The display system of claim 1, wherein the intensity of the light source is adjusted according to a relationship between a brightness of the lamp and an ambient brightness curve.

5. The display system of claim 1, wherein the intensity of the light source is adjusted according to a relationship between the brightness of the screen and an ambient brightness curve.

6. The display system of claim 1, wherein the controller is further configured to simultaneously adjust the brightness of the screen according to the ambient light luminance and adjust the intensity of the light source according to the overall brightness of the display device.

7. The display system of claim 1, wherein the controller is further configured to adjust the color temperature of the screen and the color temperature of the lamp according to the ambient light luminance and the overall brightness of the display device by:
    lowering the color temperature of the screen and the color temperature of the lamp for reaching a target color temperature when an initial value of the color temperature of the screen or an initial value of the color temperature of the lamp exceeds a maximum value; and
    raising the color temperature of the screen and the color temperature of the lamp for reaching the target color temperature when the initial value of the color temperature of the screen or the initial value of the color temperature of the lamp does not exceed the minimum value.

* * * * *